3,346,331
RECOVERY OF IODINE FROM SOLUTIONS
CONTAINING SAME
Hiromichi Nakamura, Sakashita-machi, Bunkyo-ku, Tokyo, Hiroshi Katoo, Sakusabe-machi, Chiba, Nobuaki Minejima, Choosei-gun, Chiba, Hiroshi Shimizu, Bunkyo-ku, Tokyo, Akira Satoo, Edogawa-ku, Tokyo, Masashi Nozaki, Kurume-machi, Kita-tamagun, Tokyo, and Yuu Doochi, Myogadani-machi, Tokyo, Japan, assignors to Rohm & Haas Company, Philadelphia, Pa., a corporation of Delaware
No Drawing. Filed May 4, 1964, Ser. No. 364,788
4 Claims. (Cl. 23—85)

This invention is directed to the recovery of iodine from aqueous iodide solutions. According to the present invention, iodine is recovered by a cyclical process consisting of three steps which are alternately employed as follows: (1) a portion of the iodide solution is passed over a column of anion exchange resin; (2) chlorine is added to another part of the solution which then is passed over the resin column; and (3) whenever required, the iodine is eluted from the resin by means of sodium hydroxide or other suitable eluant.

It has long been known to extract iodine from solutions such as oil well brines by acidification with a mineral acid and thereafter adding a slight excess of chlorine to liberate the iodine. Another well known method of accomplishing such extraction has been to add silver nitrate to precipitate silver iodide, filter and treat with iron to form metallic silver and a solution of ferrous iodide, then treat the solution with a slight excess of chlorine to liberate the iodine. A description of these methods is set forth in more detail in the Encyclopedia of Chemical Technology, pp. 943–4 (vol. 7, 1951—R. E. Kirk and D. F. Othmer, Interscience Encyclopedia, Inc., N.Y.C.).

One of the major objections to such methods has been the relatively large amounts of chlorine necessary to get the iodine out of solution. This problem has been alleviated to a certain extent by the additional use of anion exchange resins, the solution containing the iodide being made to contact the resin while chlorine is continuously fed to the solution. Our most preferred technique is to alternate the passage over the anion exchange resin of the iodine-containing solution, which as chlorine added to it, with the iodine-containing solution sans the added chlorine. By this method it is possible to effect even greater savings of chlorine, while liberating just as much iodine as in either of the above-described previous methods in which chlorine needs to be added more or less continuously throughout the process.

According to the present invention, an aqueous solution containing iodide ion is brought into contact with an anion exchange resin, preferably a strongly basic quaternary ammonium resin in either the salt or hydroxide form although a weakly basic polyamine resin may also be used. Intermittently, a portion of the iodide-containing solution, which is to be processed for the removal of the iodine, is treated by adding thereto an aqueous solution containing from 1 to 5 mols of chlorine to 1 equivalent of the iodide ion. This chlorine-laden solution likewise is brought into contact with the anion exchange resin. Alternately, thereafter, portions of the iodide-containing solution, some with and some without chlorine added thereto, are contacted with the resin until all the iodine which can be liberated from the solution is set free therefrom and adsorbed by the resin. Thereafter, the resin is treated with sodium, hydroxide solution or other suitable eluant to recover the iodine, and the cycle is repeated.

When NaOH is the eluant the reaction may be represented as follows:

$$3I_2 + 6NaOH \rightarrow 5NaI + NaIO_3 + 3H_2O$$

(Equation I)

To this effluent may be added a mineral acid such as sulfuric or hydrochloric acids (represented by the symbol HX), and iodine is freed and crystallized out according to the following equation:

$$5NaI + NaIO_3 + 6HX \rightarrow 3I_2 + 6NaX + 3H_2O$$

(Equation II)

The anion exchange resin which is preferred is the strongly basic quaternary ammonium type, such as Amberlite IRA–400, which is described in U.S. Patent 2,591,573. Also suitable, however, are the weakly basic polyamine type, such as Amberlite IR–45, which is described in U.S. Patent 2,591,574. A preferred procedure, moreover, is to use two ion exchange columns in series, running the solutions to be treated through both of them until leakage of iodine past the second column reaches a point which indicates that the first column has become about saturated. This procedure is explained more fully in the examples below.

The relative proportions of the chlorinated to the non-chlorinated solutions which are contacted with the anion exchange resin will vary with the relative concentrations of the chlorine in the iodine-containing solutions. The more chlorine there is in the solution, the smaller the amount of the chlorinated solution which will be required relative to the non-chlorinated solution. As an example, if the concentration of iodide ion relative to the chlorine is 3 mols to 1 the proportion of chlorinated to non-chlorinated solution could be on the order of 3 to 1. However, if the iodide to chlorine ratio were 2 mols to 1 the chlorinated to non-chlorinated ratio could be about 2 to 1. Those relative ratios are not critical to the successful operation of the invention except in terms of economy or efficiency of operation. However, the preferred ratios are quickly and readily determined by simple empirical procedures, once the concentration of iodine in a particular solution to be treated is known.

In adding the chlorine to the iodine-containing solution it is preferable to make the addition immediately before the solution is introduced to the resin. One way of doing this is to inject the chlorine under pressure into the influent at the point of entry to the ion exchange resin column. The advantage of chlorinating just before the solution contacts the resin is that the liberated iodine is adsorbed rapidly by the resin, and does not have much of an opportunity to be oxidized further.

Details regarding the manner of practicing the invention, and an illustration of the saving in chlorine which is effected thereby over the continuous chlorine addition method described above, will be found in the following illustrations:

*Example 1*

Natural gas well water containing 100 mg. of iodide per liter was first filtered to remove dirt particles and other filterable impurities. To this iodine-containing water was added 100 mg. of chlorine per liter, and the solution then was passed through two resin columns connected in series, each loaded with 12 liters of a strongly basic quaternary ammonium anion exchange resin in the chloride form (e.g., Amberlite IRA—400 Cl, a product of Rohm & Haas Company, Philadelphia, Pa.). The passage of the solution over the resin was at a flow rate of 600 liters per hour for six hours. Then, more of the same natural gas well water, filtered as before, but without the addition of chlorine, was passed through the identical resin columns at the same flow rate for two hours. This alternation of solutions passed through the ion exchange resin columns was carried on for 230 hours, during which time a total of 10.4 kg. of chlorine was consumed. At the time the passage of the solutions through the columns was stopped, the effluent from the second or lower column had a concentration of 10 mg. per liter.

The two columns were separated and through the first or upper one was passed 50 liters of an aqueous solution containing 100 g. of NaOH per liter at 60° C., at a flow rate of 24 liters per hour, to elute the iodine. (Note: Optionally, at this point a mineral acid may be added to liberate iodine which then could be removed as crystals.) Then, 60 liters of a water solution containing 100 g. of NaCl per liter was passed through the other column at 60° C., at the same 24 liters per hour flow rate, to complete elution of the iodine. A total of 9.5 kg. of iodine was collected in the two eluates, or about 69% of the total iodine in the natural gas well water. In terms of the amount of resin employed to help recover the iodine, about 790 g. of iodine was obtained per liter of resin.

The iodine in the combined eluates was recovered by adding mineral acid to make the solution slightly acid, and precipitating the iodine as crystals with the aid of an addition of chlorine. The crystals were filtered off, and the iodine remaining in the filtrate was absorbed on active carbon. The remaining 31% of the iodine in the gas well water was absorbed in the second or lower column which, since it was still not fully saturated with iodine, was capable of being reused for further iodine absorption. In practice, this second column is then used as the upper or first column in the succeeding treatment of well water. In fact, a preferred method is to employ three columns, two in series according to the method described above, and the third in a stand-by condition during which time the resin in that column can be regenerated with sodium chloride or sodium hydroxide. This technique has been termed a "merry-go-around" system, and has been described more fully in connection with a uranium adsorption process by Dr. Robert Kunin in "Ion Exchange Resins," p. 194 (2nd ed., 1958, John Wiley & Sons, Inc., New York city).

*Example 2*

For the sake of comparison, the identical experiment was repeated except for the fact that chlorinated iodine-containing solution was used throughout, instead of alternating with a non-chlorinated solution. As before, natural gas well water containing 100 mg. of iodide per liter was treated after the foreign objects were filtered out. To this water was added 100 mg. per liter of chlorine gas. The resulting solution was passed through two resin columns connected in series, each charged with 12 liters of strongly basic anion exchange resin (Amberlite IRA-400 Cl) at a flow rate of 600 liters per hour for 230 hours. The concentration of free iodine in the effluent from the second column was 10 mg. per liter when the service was stopped. The amount of chlorine consumed in this operation was 13.8 kg., or approximately 30% more than in the process described in Example 1. The columns were separated and the elution of iodine accomplished in the same manner described in the previous example. The amount of iodine in the effluent was 9.5 kg., the same as before.

As in Example 1, the iodine which was present in the form of crystals was recovered by filtration, while the remainder, which was dissolved in the eluates, was recovered on activated carbon. The iodine collected in the second or lower resin column was dealt with as described in Example 1, also.

We claim:
1. A method for liberating, separating and recovering iodine from an aqueous solution containing iodide salts, comprising division of the iodide-containing solution into at least two portions and adding chlorine to one of said portions at a concentration of 1 to 5 mols of chlorine to each equivalent of iodide ion, then alternately contacting the chlorinated and the non-chlorinated solutions with an anion exchange resin to liberate the iodine and have it picked up on the resin, and thereafter eluting the iodine by contacting the resin with at least one eluant from the class consisting of aqueous solutions of sodium hydroxide and sodium chloride.

2. The method of claim 1 in which the resin is a strongly basic quarternary ammonium anion exchange resin from the class consisting of both the salt and hydroxide forms of the resin.

3. The method of claim 1 in which the resin is a weakly basic polyamine anion exchange resin from the class consisting of both the salt and hydroxide forms of the resin.

4. A cyclical process employing the method of claim 1, in which a consecutive series of a chlorinated and a non-chlorinated solution are alternatively passed through two anion exchange resin columns connected in series until leakage of iodine past the second column reaches a point which indicates that the first column has become about saturated, removing the first column and eluting the iodine therefrom with at least one of the eluants, then using the second column as the first column in the next step in the cycle and a freshly regenerated third resin column as the second column.

References Cited

UNITED STATES PATENTS

| 1,907,975 | 5/1933 | Jones | 23—217 X |
| 1,936,553 | 11/1933 | Jones | 23—216 |
| 2,945,746 | 7/1960 | Shaw | 23—216 |
| 3,177,050 | 4/1965 | Houy | 23—216 |
| 3,219,409 | 11/1965 | Asher | 23—89 |

OSCAR R. VERTIZ, *Primary Examiner.*

EDWARD STERN, MILTON WEISSMAN,
*Examiners.*